United States Patent
Hayashi et al.

(10) Patent No.: US 9,365,733 B2
(45) Date of Patent: Jun. 14, 2016

(54) INK JET INK AND INK JET RECORDING METHOD

(71) Applicant: CANON KABUSHIKI KAISHA, Tokyo (JP)

(72) Inventors: Katsuhiro Hayashi, Yokohama (JP); Ikuo Nakazawa, Kawasaki (JP); Ryota Takeuchi, Yokohama (JP); Hideyuki Saito, Saitama (JP); Shigemoto Abe, Yokohama (JP); Taro Endo, Kawasaki (JP); Ai Sakuma, Ichikawa (JP); Naofumi Shimomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/570,206

(22) Filed: Dec. 15, 2014

(65) Prior Publication Data

US 2015/0191615 A1 Jul. 9, 2015

(30) Foreign Application Priority Data

Jan. 9, 2014 (JP) .................. 2014-002652

(51) Int. Cl.
*C09D 11/322* (2014.01)
*C09D 133/14* (2006.01)
*C09D 11/107* (2014.01)
*C08K 5/3437* (2006.01)

(52) U.S. Cl.
CPC ............ *C09D 11/322* (2013.01); *C08K 5/3437* (2013.01); *C09D 11/107* (2013.01); *C09D 133/14* (2013.01)

(58) Field of Classification Search
None
See application file for complete search history.

(56) References Cited

U.S. PATENT DOCUMENTS

| | | | |
|---|---|---|---|
| 4,895,949 A | 1/1990 | Jaffe et al. | |
| 5,506,295 A | 4/1996 | Kado et al. | |
| 7,004,579 B2 | 2/2006 | Sato et al. | |
| 7,056,972 B2 | 6/2006 | Nakazawa et al. | |
| 7,067,590 B2 | 6/2006 | Sato et al. | |
| 7,151,156 B2 | 12/2006 | Sato et al. | |
| 7,328,991 B2 | 2/2008 | Sato et al. | |
| 7,423,075 B2 | 9/2008 | Ikegami et al. | |
| 7,439,282 B2 | 10/2008 | Sato et al. | |
| 7,442,753 B2 | 10/2008 | Tsubaki et al. | |
| 7,449,513 B2 | 11/2008 | Sato et al. | |
| 7,498,364 B2 | 3/2009 | Sato et al. | |
| 7,528,179 B2 | 5/2009 | Suda et al. | |
| 7,563,853 B2 | 7/2009 | Tsubaki et al. | |
| 7,572,844 B2 | 8/2009 | Sato et al. | |
| 7,598,332 B2 | 10/2009 | Ikegami et al. | |
| 7,601,790 B2 | 10/2009 | Sato et al. | |
| 7,629,427 B2 | 12/2009 | Sato et al. | |
| 7,704,414 B2 | 4/2010 | Sato et al. | |
| 7,866,806 B2 | 1/2011 | Sato et al. | |
| 7,977,409 B2 | 7/2011 | Nishiguchi et al. | |
| 8,282,725 B2 | 10/2012 | Shimomura et al. | |
| 8,408,691 B2 | 4/2013 | Koike et al. | |
| 8,425,027 B2 | 4/2013 | Nishiwaki et al. | |
| 8,882,255 B2 | 11/2014 | Nakazawa et al. | |
| 8,889,763 B2 | 11/2014 | Hayashi et al. | |
| 2005/0124726 A1* | 6/2005 | Yatake | C09D 11/30 523/160 |
| 2009/0041932 A1* | 2/2009 | Ishizuka | C09D 11/30 427/152 |
| 2011/0316947 A1* | 12/2011 | Kojima | B82Y 30/00 347/86 |
| 2012/0147083 A1 | 6/2012 | Hayashi et al. | |
| 2013/0050355 A1* | 2/2013 | Imamura | C09D 11/101 347/84 |
| 2015/0024134 A1 | 1/2015 | Hayashi et al. | |

FOREIGN PATENT DOCUMENTS

| | | |
|---|---|---|
| EP | 1 975 160 A1 | 10/2008 |
| EP | 2 287 218 A1 | 2/2011 |
| JP | 60-35055 A | 2/1985 |
| JP | 02-38463 A | 2/1990 |
| JP | 07-242849 A | 9/1995 |
| JP | 2011-184659 A | 9/2011 |
| JP | 2011-207970 A | 10/2011 |

OTHER PUBLICATIONS

May 13, 2015 European Search Report in European Patent Appln. No. 14004324.1.

* cited by examiner

*Primary Examiner* — An Do
*Assistant Examiner* — Renee I Wilson
(74) *Attorney, Agent, or Firm* — Fitzpatrick, Cella, Harper & Scinto

(57) ABSTRACT

An ink jet ink including water, a pigment and a polymer. The pigment has a secondary amino group. The polymer contains a unit derived from a monomer having a ring structure containing a tertiary amino group.

6 Claims, No Drawings

INK JET INK AND INK JET RECORDING METHOD

BACKGROUND OF THE INVENTION

1. Field of the Invention

The present invention relates to an ink jet ink and an ink jet recording method.

2. Description of the Related Art

It is generally known that a pigment alone is hardly dispersed in a dispersion medium. Accordingly, many studies have heretofore been made in order to obtain a stable pigment dispersion. In particular, in recent years, in an ink jet recording apparatus, which has been frequently used in an office or an ordinary home, a pigment ink having compounded therein the pigment as a coloring material has often been used. Accordingly, many studies have been made to improve ejection stability of the ink by dispersing the pigment in the dispersion medium and stabilizing the dispersion.

For example, there is a proposal of an ink using a water-soluble polymer obtained by polymerizing acryloylmorpholine as a dispersant for dispersing a water-insoluble colorant in an aqueous medium (see Japanese Patent Application Laid-Open No. H07-242849).

However, even in the case of using the water-soluble polymer proposed in Japanese Patent Application Laid-Open No. H07-242849 as a dispersant, it has been difficult to continuously eject an ink using a pigment having a secondary amino group in its structure as a coloring material, by an ink jet system in a stable manner. Among constituent members of an ink jet recording head, many of members to be brought into contact with the ink (liquid-contact members) have a negatively charged surface as a surface to be brought into contact with the ink (such as a liquid-contact surface or a nozzle surface). Accordingly, when the ink using a pigment having a secondary amino group in its structure is brought into contact with the liquid-contact member, ionic bonding is produced between the pigment and the liquid-contact member. This has caused a problem in that the ink is accumulated to cause clogging or the like, and hence it is difficult to perform continuous ejection in a stable manner.

It should be noted that the ink described in Japanese Patent Application Laid-Open No. H07-242849 uses an oil-soluble dye or carbon black as a water-insoluble coloring material. Accordingly, no dispersant capable of solving the above-mentioned problem has been designed. In addition, a polymer containing a unit derived from acryloylmorpholine, which polymer is used as a dispersant in the ink described in Japanese Patent Application Laid-Open No. H07-242849, has poor solubility in water. Accordingly, even in the case of using the polymer proposed in Japanese Patent Application Laid-Open No. H07-242849 as a dispersant, the pigment has not been able to be stably dispersed in the ink, and it has been difficult to continuously eject the ink in a stable manner.

SUMMARY OF THE INVENTION

Therefore, an object of the present invention is to provide an ink jet ink that can be continuously ejected in a stable manner, although using, as a coloring material, a pigment having a secondary amino group in its structure. In addition, another object of the present invention is to provide an ink jet recording method involving using the ink jet ink.

The above-mentioned objects are achieved by the present invention described below. That is, according to an embodiment of the present invention, there is provided an ink jet ink, including water, a pigment, and a polymer, in which the pigment has a secondary amino group; and the polymer contains a unit derived from a monomer having a ring structure containing a tertiary amino group.

According to an embodiment of the present invention, the ink jet ink that can be continuously ejected in a stable manner can be provided. In addition, according to another embodiment of the present invention, the ink jet recording method involving using the ink jet ink can be provided.

Further features of the present invention will become apparent from the following description of exemplary embodiments.

DESCRIPTION OF THE EMBODIMENTS

Embodiments of the present invention are described below. However, the present invention is not limited to the following embodiments. The inventors of the present invention have first made studies on conditions that allow an ink jet ink containing a pigment having a secondary amino group to be continuously ejected in a stable manner. As a result, the inventors have found that the structure of a polymer to be contained in the ink influences the ejection stability of the ink, and have found the particular structure of an ink jet ink of the present invention. The inventors of the present invention have presumed that the mechanism by which the adoption of such particular constitution enables the ink to be continuously ejected in a stable manner is as follows.

When an image is recorded using an ink jet recording apparatus, in a recording head of the ink jet recording apparatus, the ink is brought into contact with a plurality of constituent members (liquid-contact members) of the recording head. The liquid-contact member generally has a negatively charged surface as a surface to be brought into contact with the ink (such as a liquid-contact surface or a nozzle surface). On the other hand, a pigment having a secondary amino group tends to be positively charged. Accordingly, when the ink approaches the negatively charged liquid-contact surface or nozzle surface of the liquid-contact member, ionic bonding is formed between the liquid-contact surface or the like of the liquid-contact member and the pigment. As a result, the accumulation of a pigment dispersion occurs in the vicinity of the liquid-contact surface, and hence ink clogging is liable to occur inside the recording head. In addition, the accumulation of the pigment dispersion occurring in the vicinity of the nozzle surface influences the impact accuracy of an ink droplet. As a result, it is difficult to continuously eject the ink in a stable manner.

In view of the foregoing, the inventors of the present invention have found that, in order to continuously eject the ink jet ink containing the pigment having a secondary amino group in a stable manner, it is effective to compound a polymer containing a first unit derived from a monomer having a ring structure containing a tertiary amino group into the ink. The tertiary amino group hardly dissociates, and hence even when the ink containing the polymer containing the first unit is present in the vicinity of the negatively charged liquid-contact surface or the like of the liquid-contact member, ionic bonding is not formed and only a weak electrostatic interaction occurs. In addition, because the ring structure contains the nitrogen atom of a tertiary amino group, the steric hindrance of the ring structure further weakens the electrostatic interaction. Accordingly, the polymer is hardly aggregated on the surface of the liquid-contact member, and is not accumulated.

In addition, in the ink, the pigment is present as a dispersion, but large part of the polymer is present in a dissolved state. Accordingly, the polymer has a smaller molecular size than the pigment present as a dispersion, and thus has a higher mobility. Therefore, the probability of presence of the polymer on the liquid-contact surface or the like of the liquid-contact member is higher than the probability of presence of the pigment thereon. As a result, on the liquid-contact surface or the like of the liquid-contact member, the polymer is present while forming a protective layer. Accordingly, the pigment present as a dispersion hardly acts directly on the liquid-contact surface or the like of the liquid-contact member, and hence the accumulation of the pigment dispersion does not occur. Therefore, the ink can be continuously ejected in a stable manner.

Ink Jet Ink

The ink jet ink (hereinafter sometimes referred to simply as "ink") of the present invention contains water, a pigment, and a polymer. Each of the constituent components of the ink jet ink of the present invention is described below.

Pigment

The ink of the present invention contains a pigment having a secondary amino group. A quinacridone-based pigment is preferably used as the pigment. The quinacridone-based pigment has such a structure that the secondary amino group easily emerges on the particle surface of the pigment during the process of crystal formation. Accordingly, the use of the quinacridone-based pigment can further improve ejection stability.

In addition, specific examples of the quinacridone-based pigment may include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, and C.I. Pigment Violet 19.

In addition, a mixed crystal of two or more kinds of quinacridone-based pigments is preferably used as the pigment. The mixed crystal is also called solid solution, refers to a solution in which two or more kinds of compounds are dissolved in each other to form a solid phase that is uniform as a whole, and differs from a simple mixture of two or more kinds of pigments. A production method for the mixed crystal is disclosed in, for example, Japanese Patent Application Laid-Open No. S60-35055 or Japanese Patent Application Laid-Open No. H02-38463. Whether or not two or more kinds of pigments form the mixed crystal can be easily verified by X-ray diffraction analysis or the like. In the case of the simple mixture of two or more kinds of pigments, a pattern corresponding to a superposition of the X-ray diffraction patterns of the respective pigments is obtained. In addition, the intensities of the peaks of the pattern to be obtained are proportional to the compounding ratios of the respective pigments. In contrast, when two or more kinds of pigments form the mixed crystal, an X-ray diffraction pattern different from the superposition of the X-ray diffraction patterns of the respective pigments is obtained.

In the alignment of the mixed crystal of two or more kinds of quinacridone-based pigments, strain is generated during the process of crystal formation due to a difference between functional groups with which quinacridone is modified. As a result, the secondary amino group emerges on the particle surface of the pigments more frequently in the mixed crystal of two or more kinds of quinacridone-based pigments as compared to one kind of quinacridone-based pigment. Accordingly, the use of the mixed crystal of two or more kinds of quinacridone-based pigments reduces the ejection stability of the ink.

Specific examples of the mixed crystal of two or more kinds of quinacridone-based pigments may include C.I. Pigment Red 282 and C.I. Pigment Violet 42. A commercially available product may also be used as the mixed crystal of two or more kinds of quinacridone-based pigments. Examples of the commercially available product of the mixed crystal of two or more kinds of quinacridone-based pigments may include products commercially available under the trade names of Cinquasia Magenta D 4500 J and Cinquasia Magenta D 4400 (both of which are manufactured by BASF Co.); and Inkjet Magenta E7B LV 3958 (manufactured by Clariant Co.).

Polymer

The ink of the present invention contains a polymer containing a unit (first unit) derived from a monomer having a ring structure containing a tertiary amino group. The ring structure containing a tertiary amino group is preferably a six-membered ring. The six-membered ring is known to take a chair or boat conformation, and is a structure preferred for obtaining the effect of steric hindrance. When the ring structure containing a tertiary amino group is a ring structure other than the six-membered ring (such as a five-membered ring), the effect of steric hindrance is slightly insufficient in some cases.

Specific examples of the monomer having a ring structure containing a tertiary amino group may include (meth)acryloylmorpholine, 2-N-morpholinoethyl(meth)acrylate, pentamethylpiperidinyl(meth)acrylate, maleimide(meth)acrylate (the following formula (1)), oxazolidone(meth)acrylate (the following formula (2)), and N-((meth)acryloyloxy)succinimide.

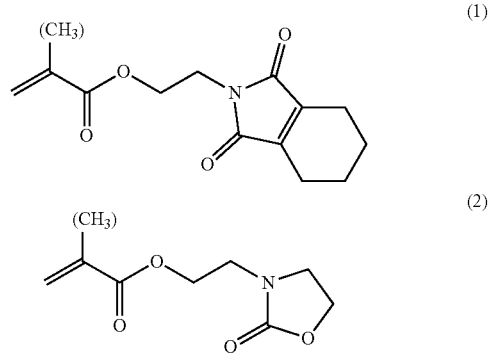

The monomer having a ring structure containing a tertiary amino group is preferably acryloylmorpholine. In the case of acryloylmorpholine, the distance between a main chain of the polymer and the tertiary amino group is small, and hence the electrostatic interaction of the tertiary amino group is affected by not only steric hindrance derived from the six-membered ring, but also steric hindrance derived from the main chain of the polymer. Accordingly, the above-mentioned electrostatic interaction can be particularly weakened, and the ink can be continuously ejected in a more stable manner.

The polymer to be used in the ink of the present invention preferably further contains a unit (second unit) derived from an acidic monomer in addition to the first unit. In order to suppress the accumulation of the polymer in the ink, the polymer is preferably dissolved or uniformly dispersed in the ink. In order to dissolve or uniformly disperse the polymer in the ink, the polymer to be used preferably has a hydrophilic functional group. It should be noted that the acidic monomer is preferred because its use in a small amount as a monomer can make the polymer hydrophilic. When a monomer other than the acidic monomer is used, it is difficult to make the polymer to be obtained sufficiently hydrophilic. In addition, an insoluble component is generated in some cases, and hence it may be difficult to perform continuous ejection in a stable manner.

Any known acidic monomer may be used as the acidic monomer. In particular, at least any one of acrylic acid and methacrylic acid is preferred because a small amount thereof can enhance the hydrophilicity of the polymer.

The content of the first unit in the polymer is preferably 0.1 times or more and 4.0 times or less as high as the content of the second unit in terms of mass ratio. When the mass ratio is less than 0.1 times, the hydrophilicity of the polymer becomes excessively strong as compared to the interaction between the tertiary amino group in the polymer and the liquid-contact surface or the like of the liquid-contact member, with the result that the polymer hardly forms a protective layer on the liquid-contact surface or the like of the liquid-contact member. Accordingly, the pigment is liable to directly interact with the liquid-contact surface or the like of the liquid-contact member, and accumulated matter of the pigment is generated to make it difficult to continuously eject the ink in a stable manner in some cases. On the other hand, when the mass ratio is more than 4.0 times, the interaction between the tertiary amino group in the polymer and the liquid-contact surface or the like of the liquid-contact member becomes excessively large as compared to the hydrophilicity of the polymer. Accordingly, the polymer is liable to be accumulated in the vicinity of the liquid-contact surface or the like of the liquid-contact member, and hence it is difficult to continuously eject the ink in a stable manner in some cases.

The polymer to be used in the ink of the present invention preferably further contains a unit (third unit) derived from an aromatic monomer in addition to the first unit. It is preferred not only that the polymer to be used in the ink of the present invention protects the liquid-contact surface or the like of the liquid-contact member, but also that at least part of the polymer has affinity for the pigment, thereby functioning as a dispersant. When a different polymer is used as a dispersant in addition to the above-mentioned polymer, the respective polymers repeat adsorption and desorption in the ink. Consequently, the intended function may not be exhibited owing to, for example, the interaction of the polymer to be used for the ink of the present invention with the pigment, or the interaction of the polymer used as the dispersant with the liquid-contact surface or the like of the liquid-contact member. Accordingly, the polymer to be used in the ink of the present invention preferably also functions as a dispersant for dispersing the pigment. Therefore, in order to improve its affinity for the pigment as well, the polymer to be used in the ink of the present invention preferably further contains the third unit derived from an aromatic monomer.

Any known aromatic monomer may be used as the aromatic monomer. In particular, at least any one of styrene and benzyl(meth)acrylate is preferred because a small amount thereof can enhance the affinity of the polymer for the pigment.

It should be noted that, as a constituent monomer component of the polymer, may be used "another monomer" different from the above-mentioned monomer having a ring structure containing a tertiary amino group, acidic monomer, and aromatic monomer may be used. Any known monomer may be used as the "another monomer".

In the present invention, the content of the polymer in the ink is preferably 0.1 times or more and 2.0 times or less as high as the content of the pigment in terms of mass ratio. When the mass ratio is less than 0.1 times, the amount of the polymer with respect to the pigment is small, and hence the polymer hardly forms a protective layer on the liquid-contact surface or the like of the liquid-contact member. Accordingly, the pigment is liable to directly interact with the liquid-contact surface or the like of the liquid-contact member to generate accumulated matter, and hence stable continuous ejection is difficult in some cases. On the other hand, when the mass ratio is more than 2.0 times, the concentration of the polymer in the ink increases to increase the viscosity of the ink. Accordingly, the supply of the ink tends to become insufficient during continuous ejection, and thus the continuous ejection cannot be performed in a stable manner in some cases.

Aqueous Medium

The ink of the present invention may use water, or an aqueous medium that is a mixed solvent of water and a water-soluble organic solvent. The content (mass %) of the water-soluble organic solvent in the ink is preferably 3.0 mass % or more and 50.0 mass % or less with reference to the total mass of the ink. Any of those hitherto generally used for ink may be used as the water-soluble organic solvent. Examples thereof may include alcohols, glycols, alkylene glycols with an alkylene group having 2 to 6 carbon atoms, polyethylene glycols, nitrogen-containing compounds, and sulfur-containing compounds. One kind of those water-soluble organic solvents may be used alone, or two or more kinds thereof may be used in combination. Deionized water (ion-exchanged water) is preferably used as the water. The content (mass %) of the water in the ink is preferably 50.0 mass % or more and 95.0 mass % or less with reference to the total mass of the ink.

Other Components

The ink of the present invention may contain, in addition to the above-mentioned components, water-soluble organic compounds that are solid at normal temperature, such as polyhydric alcohols such as trimethylolpropane and trimethylolethane; and urea and a urea derivative such as ethyleneurea, as required. Further, the ink may also contain various additives such as a surfactant, a pH adjuster, a rust inhibitor, an antiseptic, a fungicide, an antioxidant, an anti-reducing agent, an evaporation-promoting agent, and a chelating agent, as required.

Ink Jet Recording Method

An ink jet recording method of the present invention is a method including ejecting the ink jet ink of the present invention described above from a recording head of an ink jet system to record an image on a recording medium. In addition, the recording head preferably has a nozzle surface having a fluorine-containing group. As a system for ejecting the ink, there may be mentioned a system involving applying mechanical energy to ink and a system involving applying thermal energy to ink. In the present invention, the system involving applying thermal energy to ink is particularly preferably adopted. Except for the use of the ink of the present invention, the process of the ink jet recording method may be a known process.

EXAMPLES

Next, the present invention is more specifically described by way of Examples and Comparative Examples. The present invention is not limited to Examples described below, and various modifications are possible without departing from the gist of the present invention. It should be noted that, in the description of the amounts of components, "part(s)" and "%" are by mass unless otherwise specified.

Preparation of Polymer

Polymers-1 to -17

A flask equipped with a stirrer, a nitrogen inlet tube, a reflux condenser, and a thermometer was loaded with 200 parts of methyl ethyl ketone, and then the stirred methyl ethyl ketone was heated to 80° C. under a nitrogen atmosphere. After that, a mixed liquid of monomers whose kinds and amounts were shown in Tables 1-1 and 1-2, and a mixed liquid of 1.9 parts of a polymerization initiator (trade name: "V-59", manufactured by Wako Pure Chemical Industries, Ltd.) and 20 parts of methyl ethyl ketone were each added dropwise over 2 hours while the temperature was maintained at 80° C. After the dropwise addition, further, while the temperature was maintained at 80° C., the mixture was stirred for 4 hours to obtain solutions of polymers-1 to -17 in methyl ethyl ketone. Then, 0.9 equivalent of potassium hydroxide with respect to the acid value of the polymer, and an appropriate amount of ion-exchanged water were added, and then the methyl ethyl ketone was removed under reduced pressure to obtain 25% polymer aqueous solutions. Tables 1-1 and 1-2 show the mass ratio ((A)/(B)) of the first unit to the second unit in the polymers-1 to -17 contained in the obtained polymer aqueous solutions.

TABLE 1-1

(Unit in upper rows: parts)

| | | Monomer | Polymer -1 | -2 | -3 | -4 | -5 | -6 | -7 | -8 |
|---|---|---|---|---|---|---|---|---|---|---|
| (A) | (A-1) | Acryloylmorpholine | 20 | | | | | | 20 | 20 |
| | | Pentamethylpiperidinyl methacrylate | | 20 | | | | | | |
| | | 2-N-Morpholinoethyl acrylate | | | 20 | | | | | |
| | (A-2) | Maleimide acrylate* | | | | 20 | | | | |
| | | Oxazolidone acrylate* | | | | | 20 | | | |
| | | N-(Acryloyloxy)succinimide | | | | | | 20 | | |
| (A') | | Dimethylaminoethyl acrylate | | | | | | | | |
| (B) | | Acrylic acid | 20 | 20 | 20 | 20 | 20 | 20 | | |
| | | Methacrylic acid | | | | | | | 20 | |
| (C) | | Styrene | 60 | 60 | 60 | 60 | 60 | 60 | 60 | |
| | | Benzyl methacrylate | | | | | | | | |
| | | 2-Hydroxyethylacrylate | | | | | | | | 80 |
| | | Methyl methacrylate | | | | | | | | |
| (A)/(B) | | | 1.0 | 1.0 | 1.0 | 1.0 | 1.0 | 1.0 | 1.0 | — |

(A): monomers having a ring structure containing a tertiary amino group
(A-1): monomers having a six-membered ring containing a tertiary amino group
(A-2): monomers having a ring structure other than a six-membered ring, containing a tertiary amino group
(A'): monomer having no ring structure, containing a tertiary amino group
(B): acidic monomers
(C): aromatic monomers
(D): other monomers
(A)/(B): mass ratio of a first unit to a second unit

TABLE 1-2

(Unit in upper rows: parts)

| | | Monomer | Polymer -9 | -10 | -11 | -12 | -13 | -14 | -15 | -16 | -17 |
|---|---|---|---|---|---|---|---|---|---|---|---|
| (A) | (A-1) | Acryloylmorpholine | 2 | 3 | 40 | 42 | 20 | 20 | | | |
| | | Pentamethylpiperidinyl methacrylate | | | | | | | | | |
| | | 2-N-Morpholinoethyl acrylate | | | | | | | | | |
| | (A-2) | Maleimide acrylate* | | | | | | | | | |
| | | Oxazolidone acrylate* | | | | | | | | | |
| | | N-(Acryloyloxy)succinimide | | | | | | | | | |
| (A') | | Dimethylaminoethyl acrylate | | | | | | | 20 | | |
| (B) | | Acrylic acid | 30 | 30 | 10 | 10 | 20 | 20 | 20 | 20 | 30 |
| | | Methacrylic acid | | | | | | | | | |
| (C) | | Styrene | 68 | 67 | 50 | 48 | | | 60 | 60 | 70 |
| | | Benzyl methacrylate | | | | | 60 | | | | |
| (D) | | 2-Hydroxyethylacrylate | | | | | | 60 | | | |
| | | Methyl methacrylate | | | | | | | | 20 | |
| (A)/(B) | | | 0.07 | 0.1 | 4.0 | 4.2 | 1.0 | 1.0 | 0 | 0 | 0 |

(A): monomers having a ring structure containing a tertiary amino group
(A-1): monomers having a six-membered ring containing a tertiary amino group
(A-2): monomers having a ring structure other than a six-membered ring, containing a tertiary amino group
(A'): monomer having no ring structure, containing a tertiary amino group
(B): acidic monomers
(C): aromatic monomers
(D): other monomers
(A)/(B): mass ratio of a first unit to a second unit It should be noted that "maleimide acrylate" in Tables 1-1 and 1-2 is a compound represented by the following formula (A). In addition, "oxazolidone acrylate" in Tables 1-1 and 1-2 is a compound represented by the following formula (B).

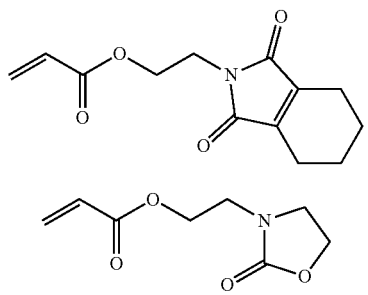

Preparation of Ink

Examples 1 to 23 and Comparative Examples 1 and 2

Inks 1 to 25

Respective components were mixed according to the following compounding formulation (100 parts in total), and subjected to premixing (10,000 rpm, 60 minutes) using a dispersion/emulsification machine (trade name: "CLEARMIX", manufactured by M Technique Co., Ltd.). After that, the mixture was subjected to dispersion treatment (treatment pressure: 200 MPa, 20-pass treatment) using a wet type atomizer (trade name: "NanoVater L-AS", manufactured by YOSHIDA KIKAI CO., LTD.) to obtain a pigment dispersion (pigment content: 20%). Table 2 shows the kind of the pigment used, its C.I. No., whether or not the pigment is a mixed crystal (the case where the pigment is a mixed crystal is indicated as "mixed crystal"), and its compounding amount (parts). In addition, Table 2 shows the kind and compounding amount (parts) of the polymer used (it should be noted that the compounding amount is the compounding amount (parts) of the 25% polymer aqueous solution).

Compounding Formulation

| Pigment | 20 parts |
| --- | --- |
| Polymer aqueous solution (25%) | See Table 2 |
| Ion-exchanged water | Balance |

TABLE 2

| | Ink | Pigment Kind | C.I. No. | Mixed crystal or not | Compounding amount (parts) | Polymer Kind | Compounding amount (parts)*[1] |
| --- | --- | --- | --- | --- | --- | --- | --- |
| Example 1 | Ink 1 | E7B | — | Mixed crystal | 20 | Polymer-1 | 60 |
| Example 2 | Ink 2 | 4500 | — | Mixed crystal | 20 | Polymer-1 | 60 |
| Example 3 | Ink 3 | E7B | — | Mixed crystal | 20 | Polymer-4 | 60 |
| Example 4 | Ink 4 | E7B | — | Mixed crystal | 20 | Polymer-5 | 60 |
| Example 5 | Ink 5 | E7B | — | Mixed crystal | 20 | Polymer-5 | 60 |
| Example 6 | Ink 6 | E7B | — | Mixed crystal | 20 | Polymer-2 | 60 |
| Example 7 | Ink 7 | E7B | — | Mixed crystal | 20 | Polymer-3 | 60 |
| Example 8 | Ink 8 | E7B | — | Mixed crystal | 20 | Polymer-7 | 60 |
| Example 9 | Ink 9 | E7B | — | Mixed crystal | 20 | Polymer-8 | 60 |
| Example 10 | Ink 10 | E7B | — | Mixed crystal | 20 | Polymer-9 | 60 |
| Example 11 | Ink 11 | E7B | — | Mixed crystal | 20 | Polymer-10 | 60 |
| Example 12 | Ink 12 | E7B | — | Mixed crystal | 20 | Polymer-11 | 60 |
| Example 13 | Ink 13 | E7B | — | Mixed crystal | 20 | Polymer-12 | 60 |
| Example 14 | Ink 14 | E7B | — | Mixed crystal | 20 | Polymer-13 | 60 |
| Example 15 | Ink 15 | E7B | — | — | 20 | Polymer-14 Polymer-17 | 60 20 |
| Example 16 | Ink 16 | 5GX01 | P.Y. 74 | — | 20 | Polymer-1 | 60 |
| Example 17 | Ink 17 | 4G | P.Y. 155 | — | 20 | Polymer-1 | 60 |
| Example 18 | Ink 18 | 4550 | P.Y. 122 | — | 20 | Polymer-1 | 60 |
| Example 19 | Ink 19 | 5120 | P.Y. 19 | — | 20 | Polymer-1 | 60 |
| Example 20 | Ink 20 | E7B | — | Mixed crystal | 20 | Polymer-1 Polymer-17 | 6 20 |
| Example 21 | Ink 21 | E7B | — | Mixed crystal | 20 | Polymer-1 Polymer-17 | 8 20 |
| Example 22 | Ink 22 | E7B | — | Mixed crystal | 20 | Polymer-1 | 60 |
| Example 23 | Ink 23 | E7B | — | Mixed crystal | 20 | Polymer-1 | 60 |
| Comparative Example 1 | Ink 24 | E7B | — | Mixed crystal | 20 | Polymer-15 | 60 |
| Comparative Example 2 | Ink 25 | E7B | — | Mixed crystal | 20 | Polymer-16 | 60 |

*[1]Compounding amount of 25% polymer aqueous solution

It should be noted that the meanings of abbreviations representing the kinds of pigments in Table 2 are shown below.

E7B: trade name "Inkjet Magenta E7B LV 3958" (mixed crystal of quinacridone-based pigments, manufactured by Clariant Co.)
4500: trade name "Cinquasia Magenta D 4500 J" (mixed crystal of quinacridone-based pigments, manufactured by BASF Co.)
5GX01: trade name "Hansa Yellow 5GX 01 LV 3344" (azo-based pigment, manufactured by Clariant Co.)
4G: trade name "Ink Jet Yellow 4G VP 2532" (azo-based pigment, manufactured by Clariant Co.)
4550: trade name "Cinquasia Magenta D 4550 J" (quinacridone-based pigment, manufactured by BASF Co.)
5120: trade name "Cinquasia Violet L 5120" (quinacridone-based pigment, manufactured by BASF Co.)

Next, respective components were mixed according to the following compounding formulation (100 parts in total), and then sufficiently stirred. After that, the mixtures were subjected to pressure filtration through a membrane filter having a pore size of 1.2 μm (trade name: "HDCII Filter", manufactured by Pall Corporation) to prepare inks 1 to 25.

Compounding Formulation

| | |
|---|---|
| Pigment dispersion | 20.0 parts |
| Glycerin | 5.0 parts |
| Polyethylene glycol (number-average molecular weight: 1,000) | 5.0 parts |
| Diethylene glycol | 4.0 parts |
| Surfactant (trade name "ACETYLENOL E100", manufactured by Kawaken Fine Chemicals Co., Ltd.) | 1.0 part |
| Polymer aqueous solution (25%): In the cases of the inks 22 and 23, a polymer aqueous solution (25%) was further added at the time of the compounding of the ink so that the polymer concentration became a concentration shown in Table 3. | |
| Ion-exchanged water | Balance |

Table 3 shows the pigment concentrations of the obtained inks, and the kinds and concentrations of the polymers. In addition, Table 3 shows the mass ratio of the content of the polymer containing the first unit to the content of the pigment as "polymer/pigment".

TABLE 3

| | | Pigment | Polymer | | Polymer/pigment*[1] |
|---|---|---|---|---|---|
| | Ink | concentration (%) | Kind | Concentration (%) | (mass ratio) |
| Example 1 | Ink 1 | 4 | Polymer-1 | 3.0 | 0.75 |
| Example 2 | Ink 2 | 4 | Polymer-1 | 3.0 | 0.75 |
| Example 3 | Ink 3 | 4 | Polymer-4 | 3.0 | 0.75 |
| Example 4 | Ink 4 | 4 | Polymer-5 | 3.0 | 0.75 |
| Example 5 | Ink 5 | 4 | Polymer-6 | 3.0 | 0.75 |
| Example 6 | Ink 6 | 4 | Polymer-2 | 3.0 | 0.75 |
| Example 7 | Ink 7 | 4 | Polymer-3 | 3.0 | 0.75 |
| Example 8 | Ink 8 | 4 | Polymer-7 | 3.0 | 0.75 |
| Example 9 | Ink 9 | 4 | Polymer-8 | 3.0 | 0.75 |
| Example 10 | Ink 10 | 4 | Polymer-9 | 3.0 | 0.75 |
| Example 11 | Ink 11 | 4 | Polymer-10 | 3.0 | 0.75 |
| Example 12 | Ink 12 | 4 | Polymer-11 | 3.0 | 0.75 |
| Example 13 | Ink 13 | 4 | Polymer-12 | 3.0 | 0.75 |
| Example 14 | Ink 14 | 4 | Polymer-13 | 3.0 | 0.75 |
| Example 15 | Ink 15 | 4 | Polymer-14 | 3.0 | 0.75 |
| | | | Polymer-17 | 1.0 | |
| Example 16 | Ink 16 | 4 | Polymer-1 | 3.0 | 0.75 |
| Example 17 | Ink 17 | 4 | Polymer-1 | 3.0 | 0.75 |
| Example 18 | Ink 18 | 4 | Polymer-1 | 3.0 | 0.75 |
| Example 19 | Ink 19 | 4 | Polymer-1 | 3.0 | 0.75 |
| Example 20 | Ink 20 | 4 | Polymer-1 | 0.3 | 0.08 |
| | | | Polymer-17 | 1.0 | |
| Example 21 | Ink 21 | 4 | Polymer-1 | 0.4 | 0.10 |
| | | | Polymer-17 | 1.0 | |
| Example 22 | Ink 22 | 4 | Polymer-1 | 8.0 | 2.00 |
| Example 23 | Ink 23 | 4 | Polymer-1 | 8.2 | 2.05 |
| Comparative Example 1 | Ink 24 | 4 | Polymer-15 | 3.0 | 0 |
| Comparative Example 2 | Ink 25 | 4 | Polymer-16 | 3.0 | 0 |

*[1]Mass ratio of content of polymer containing first unit to content of pigment Evaluation: Ejection Stability An ink cartridge filled with each ink obtained in the foregoing was mounted onto an ink jet recording apparatus configured to eject ink by the action of thermal energy (trade name: "PIXUS iP3100", manufactured by Canon Inc.). In this apparatus, an image that has a resolution of 1,200 dpi×1,200 dpi and is recorded under such a condition that one 5-picoliter ink droplet is applied to a unit region of $1/1,200$ inch×$1/1,200$ inch is defined as a solid image having a recording duty of 100%. A solid image measuring 19 cm×26 cm was recorded with a recording duty of 100% on 50 sheets of A4-size PPC paper (trade name: "GF-500", manufactured by Canon Inc.). It should be noted that a ceramic heater was attached to the liquid cartridge to control the temperature in an ejection nozzle during the evaluation so as to be constant at 50° C. The solid image-recorded articles of the 10th sheet and the 50th sheet in this case were visually observed, and the ejection stability of the ink was evaluated according to the evaluation criteria shown below. Table 4 shows the evaluation results. It should be noted that, in the present invention, among the following evaluation criteria, "C" and "D" were defined as unacceptable levels.

A: No white stripe or blurring occurred even on the 50th sheet.
B: No white stripe or blurring occurred on the 10th sheet, but a white stripe or blurring occurred on the 50th sheet.
C: A white stripe or blurring occurred on the 10th sheet.
D: The ejection stability was not able to be evaluated.

TABLE 4

|  | Ink | Ejection stability |
| --- | --- | --- |
| Example 1 | Ink 1 | A |
| Example 2 | Ink 2 | A |
| Example 3 | Ink 3 | B |
| Example 4 | Ink 4 | B |
| Example 5 | Ink 5 | B |
| Example 6 | Ink 6 | B |
| Example 7 | Ink 7 | B |
| Example 8 | Ink 8 | A |
| Example 9 | Ink 9 | B |
| Example 10 | Ink 10 | B |
| Example 11 | Ink 11 | A |
| Example 12 | Ink 12 | A |
| Example 13 | Ink 13 | B |
| Example 14 | Ink 14 | A |
| Example 15 | Ink 15 | B |
| Example 16 | Ink 16 | B |
| Example 17 | Ink 17 | B |
| Example 18 | Ink 18 | A |
| Example 19 | Ink 19 | A |
| Example 20 | Ink 20 | B |
| Example 21 | Ink 21 | A |
| Example 22 | Ink 22 | A |
| Example 23 | Ink 23 | B |
| Comparative Example 1 | Ink 24 | C |
| Comparative Example 2 | Ink 25 | C |

Comparative Example 3

A copolymer of acryloylmorpholine and styrene described in "Example 4" in Japanese Patent Application Laid-Open No. H07-242849 was synthesized and an attempt was made to dissolve the copolymer in water. However, no polymer aqueous solution was able to be obtained. As a result, the ejection stability was evaluated as "D".

Comparative Example 4

A copolymer of acryloylmorpholine and vinyl pivalate described in "Example 5" in Japanese Patent Application Laid-Open No. H07-242849 was synthesized and an attempt was made to dissolve the copolymer in water. However, no polymer aqueous solution was able to be obtained. As a result, the ejection stability was evaluated as "D".

Comparative Example 5

A homopolymer of acryloylmorpholine described in "Example 6" in Japanese Patent Application Laid-Open No. H07-242849 was synthesized and an attempt was made to dissolve the homopolymer in water. However, no polymer aqueous solution was able to be obtained. As a result, the ejection stability was evaluated as "D".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-002652, filed Jan. 9, 2014, which is hereby incorporated by reference herein in its entirety.

What is claimed is:

1. An ink jet ink, comprising:
water; and
a pigment dispersed by a polymer dispersant,
wherein the pigment has a secondary amino group,
wherein the polymer dispersant includes (i) a unit derived from an acryloylmorpholine and (ii) a unit derived from an acidic monomer, and
wherein a content of the unit derived from the acryloylmorpholine is 0.1 times or more and 4.0 times or less as high as a content of the unit derived from the acidic monomer in terms of mass ratio.

2. An ink jet ink according to claim 1, wherein the polymer dispersant further includes a unit derived from an aromatic monomer.

3. An ink jet ink according to claim 1, wherein the pigment comprises a quinacridone-based pigment.

4. An ink jet ink according to claim 1, wherein the pigment comprises a mixed crystal of two or more kinds of quinacridone-based pigments.

5. An ink jet ink according to claim 1, wherein a content of the polymer dispersant is 0.1 times or more and 2.0 times or less as high as a content of the pigment in terms of mass ratio.

6. An ink jet recording method, comprising ejecting an ink from a recording head of an ink jet system to record an image on a recording medium,
wherein the recording head has a nozzle surface having a fluorine-containing group, and
wherein the ink is the ink jet ink according to claim 1.

* * * * *